(12) United States Patent
Hotta et al.

(10) Patent No.: US 9,172,100 B2
(45) Date of Patent: Oct. 27, 2015

(54) FUEL CELL SYSTEM

(75) Inventors: Yutaka Hotta, Toyota (JP); Michitaro Itoga, Okazaki (JP); Makoto Takeyama, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 17 days.

(21) Appl. No.: 13/616,237

(22) Filed: Sep. 14, 2012

(65) Prior Publication Data

US 2013/0017470 A1    Jan. 17, 2013

Related U.S. Application Data

(63) Continuation of application No. PCT/JP2011/065887, filed on Jul. 12, 2011.

(51) Int. Cl.
*H01M 8/04*     (2006.01)
*H01M 8/02*     (2006.01)

(52) U.S. Cl.
CPC ........ *H01M 8/04029* (2013.01); *H01M 8/0267* (2013.01); *H01M 8/04753* (2013.01); *H01M 2250/20* (2013.01); *Y02E 60/50* (2013.01); *Y02T 90/32* (2013.01)

(58) Field of Classification Search
CPC .......... H01M 2250/20; H01M 8/0267; H01M 8/04029; H01M 8/04753; Y02E 60/50; Y02T 90/32
USPC .......................................... 429/400–535, 120
See application file for complete search history.

(56) References Cited

U.S. PATENT DOCUMENTS

| | | | |
|---|---|---|---|
| 4,081,693 A * | 3/1978 | Stone | 429/434 |
| 6,372,372 B1 | 4/2002 | D'Aleo et al. | |
| 6,478,340 B1 * | 11/2002 | Butler | 285/131.1 |
| 6,541,148 B1 | 4/2003 | Walsh et al. | |
| 6,686,080 B2 * | 2/2004 | Farkash et al. | 429/434 |
| 7,029,780 B2 * | 4/2006 | Ogami et al. | 429/413 |
| 2006/0102398 A1 * | 5/2006 | Mizuno | 180/65.3 |

FOREIGN PATENT DOCUMENTS

| | | |
|---|---|---|
| DE | 10153372 A1 | 5/2002 |
| JP | 8-167424 A | 6/1996 |
| JP | 2000-090955 A | 3/2000 |
| JP | 2001-068141 A | 3/2001 |

(Continued)

OTHER PUBLICATIONS

International Search Report & Written Opinion mailed Aug. 9, 2011 of PCT/JP2011/065887.

*Primary Examiner* — Milton I Cano
*Assistant Examiner* — Ling R Zeng
(74) *Attorney, Agent, or Firm* — Kenyon & Kenyon LLP (57) ABSTRACT

A fuel cell system to be mounted on an electric vehicle such as a hybrid vehicle or an electric vehicle. Cooling water is supplied from a cooling water inlet of a stack manifold, flows through a fuel cell stack, and returns to the stack manifold. A groove is formed on the rear surface side of the stack manifold, constituting, together with a terminal, a cooling water channel. The cooling water flows through the cooling water channel, and is discharged to the outside from a cooling water outlet. The cooling water channel is formed extending from the rear side to the front side of the vehicle, and warms an end plate. A pipe length of the cooling water channel to a radiator mounted in a front part of the vehicle is reduced.

7 Claims, 6 Drawing Sheets

(56) References Cited

FOREIGN PATENT DOCUMENTS

| | | |
|---|---|---|
| JP | 2001-143740 A | 5/2001 |
| JP | 2005-005196 A | 1/2005 |
| JP | 2005-158629 A | 6/2005 |
| JP | 2005-285682 A | 10/2005 |
| JP | 2008-177100 A | 7/2008 |
| JP | 2008-277039 A | 11/2008 |
| JP | 2009-277425 A | 11/2009 |
| JP | 2010-135101 A | 6/2010 |
| WO | 2008/087542 A1 | 7/2008 |

* cited by examiner

FUEL CELL SYSTEM

This is a By-Pass Continuation Application of PCT/JP2011/065887 filed 12 Jul. 2011, the contents of which are incorporated herein by reference.

TECHNICAL FIELD

The present invention relates to a fuel cell system, and in particular to a structure of a cooling water channel.

BACKGROUND ART

In a fuel cell that generates power through electrochemical reaction between fuel gas and oxidizing gas, an end plate is provided at an end part of a fuel cell stack in the cell stacking direction, and the temperature of the end plate increases due to the heat discharged from the end plate. This causes condensation in a cell due to difference in temperature, and thus water pooling in a cell, which leads to a problem of deterioration in power generation performance.

Patent Document 1 below describes formation of a cooling agent channel on at least one of the pressure plates that make a pair for fastening a plurality of cells sandwiched therebetween for allowing cooling agent to flow therein to thereby warm the pressure plate.

RELATED ART DOCUMENT

Patent Document

Patent Document 1: Japanese Patent Laid-open Publication No. 2001-68141

Problem to be Solved by the Invention

Formation of a cooling agent channel on a pressure plate or an end plate to warm the pressure plate or the end plate is effective in preventing condensation in an end cell. However, as the cooling agent having flowed in the pressure plate or the end plate needs to be supplied to a heat discharger, such as a radiator or the like, it is necessary to form a cooling agent channel in the pressure plate or the end plate in consideration of a path to the radiator. The above described conventional art does not include consideration in this view, and consequently, a lengthy cooling agent channel may result, depending on the position of a radiator mounted, which increases the pipe length of the entire system.

In formation of a cooling agent channel in a pressure plate or an end plate, the pressure plate or the end plate may become at the same potential as that of the stack at high voltage, depending on the conductivity of the cooling agent. Accordingly, in a case where the pressure plate or the end plate is covered by a stack case and mounted on an electric vehicle, such as a hybrid vehicle or an electric vehicle, electric insulation needs to be ensured between the vehicle frame and the stack case. This enlarges the size of the system.

An object of the present invention is to provide a fuel cell system capable of preventing condensation in a cell and to make the system compact.

DISCLOSURE OF INVENTION

Means to Solve the Problem

A full cell system according to the present invention comprises a fuel cell stack comprising a plurality of cells being stacked; a terminal provided at an end part of the fuel cell stack in a stacking direction; a stack manifold adjacent to the terminal; and an end plate adjacent to the stack manifold, wherein a groove is formed on a surface of the stack manifold, the surface being opposed to the terminal, the groove, the terminal, and the end plate together forming a channel for cooling water that flows in the fuel cell stack and circulates outside the fuel cell stack, and the channel being formed such that, when the fuel cell system is mounted on a vehicle, the cooling water flows from a rear side to a front side of the vehicle.

In one embodiment of the present invention, a downstream end part of a cooling water channel may penetrate the stack manifold and the end plate and is connected to a cooling water outlet formed on the end plate, and the cooling water may be discharged to outside of the end plate without contacting the end plate.

In another embodiment of the present invention, a rib may be formed along the groove on the surface of the stack manifold, the surface being opposed to the terminal.

In another embodiment of the present invention, a cathode gas inlet and a cathode gas outlet may be formed on the stack manifold, and a rib for adjusting a flow amount of cathode gas may be formed in at least either one of the cathode gas inlet and the cathode gas outlet.

In another embodiment of the present invention, a hole for discharging air contained in the cooling water may be formed on an end part of the stack manifold at a position at a height equal to or higher than an upstream end part of the cooling water channel.

In another embodiment of the present invention, a cooling water outlet for discharging the cooling water to the outside, a cathode gas inlet, and a cathode gas outlet may be formed on the end plate, and the cooling water outlet, the cathode gas inlet, and the cathode gas outlet may be formed concentrated on the front side of a vehicle when the fuel cell system is mounted on the vehicle.

In another embodiment of the present invention, the system may be mounted on a vehicle by electrically connecting the end plate to a frame of the vehicle. Note that a case where the end plate is connected to a frame of a vehicle includes a case in which an endplate is fixed to a frame of a vehicle via a non-insulating member (e.g., a stack frame or the like), besides a case in which the end plate is directly fixed to a frame of a vehicle.

Advantage of Invention

According to the present invention, as cooling water having cooled the fuel cell stack flows in the stack manifold, it is possible to reduce drop of the end cell temperature and to thereby prevent deterioration of power generation performance due to condensation in an end cell. Further, a cooling water channel in the stack manifold is formed extending from the rear side to the front side of the vehicle, the length of a pipe extending to a radiator mounted on a front part of the vehicle is reduced, and accordingly, the system can be made compact. Further, according to the present invention, as the cooling water is not in direct contact with the end plate, the end plate is reliably insulated. This enables electrical connection of the fuel cell system to a vehicle frame, using the end plate, which enables a compact system.

BEST MODE FOR CARRYING OUT THE INVENTION

In the following, an embodiment of the present invention will be described based on the drawings.

Figure 1:
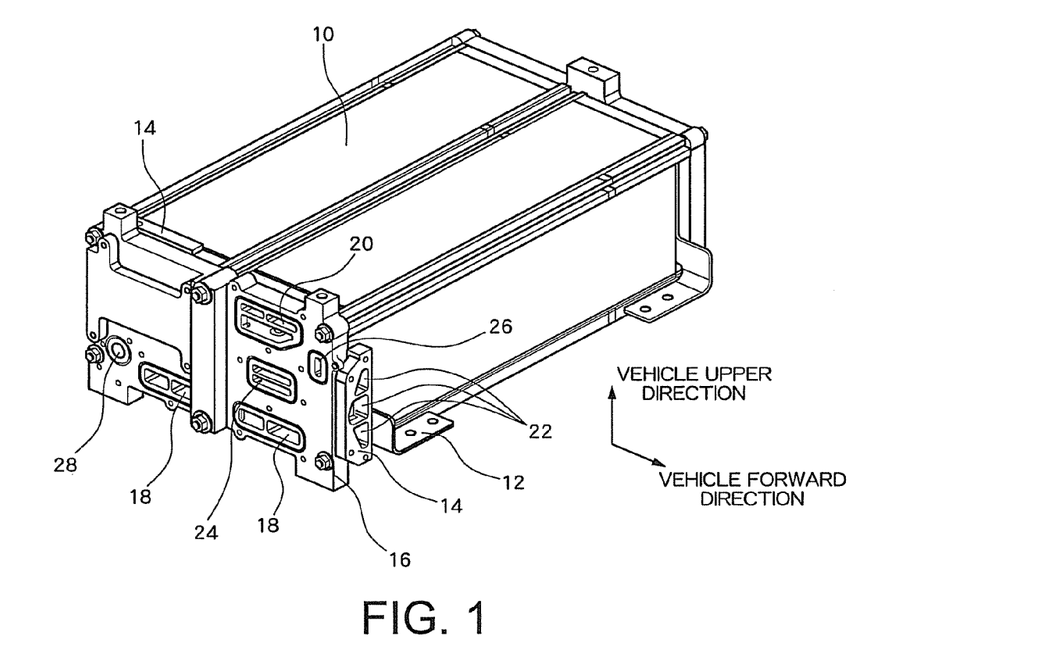
FIG. 1 is a perspective view showing external appearance of a fuel cell system in an embodiment.

FIG. 1 is a perspective view showing external appearance of a fuel cell system in this embodiment. The fuel cell system comprises a fuel cell stack 10 comprising a plurality of single cells stacked one on the other, a current collector plate or a terminal 12 for collecting power generated by the respective cells, a stack manifold 14, and an end plate 16. The fuel cell stack 10, one end plate, and the stack case are formed integrally. The stack case on the other side of the fuel cell stack is left as an open end, and the stack manifold 14 and the end plate 16 are provided on the open end side.

The external appearance of the fuel cell stack 10 is a substantially rectangular parallelepiped, and the fuel cell stack 10 is to be mounted on an electric vehicle such as a hybrid vehicle or an electric vehicle such that the longitudinal direction thereof extends along the left-right direction, or the vehicle width direction. That is, the fuel cell stack 10 is mounted such that the shorter-side direction thereof extends along the front-back direction of the electric vehicle. In the diagram, in a relationship with the fuel cell stack 10, the forward direction and the upper direction of the vehicle are indicated by arrows.

The stack manifold 14 is mounted between the terminal 12 and the end plate 16, and has three cooling water inlets 22 formed thereon in the up-down direction of the vehicle. A radiator (not shown) is mounted in a front part of the vehicle, so that cooling water from the radiator is supplied via the cooling water inlet 22 formed on the stack manifold 14 to the cells in the fuel cell stack.

On the end plate 16, a cathode gas inlet 18, a cathode gas outlet 20, a cooling water outlet 24, an anode gas inlet 26, and an anode gas outlet 28 are formed. Specifically, two cathode gas inlets 18 are formed in total, one on the forward side and the other on the rearward side of the vehicle, that is, opposite to the forward side, though it may be acceptable to provide only one cathode gas inlet 18 on the forward side of the vehicle. The cathode gas inlet 18, the cathode gas outlet 20, the cooling water outlet 24, and the anode gas inlet 26 are all formed concentrated on the forward side of the endplate 16 of the vehicle. Meanwhile, the anode gas outlet 28 is formed on the rearward side of the end plate 16 of the vehicle. Gas or cooling water inlets and outlets are formed concentrated on the forward side of the vehicle, as described above. This is to ensure a space for mounting accessories, such as a hydrogen pump, a gas-liquid separator, and an injector, on the end plate 16. When accessories, such as a hydrogen pump, are mounted on the rearward side of the end plate 16 of the vehicle, the entire system can be made compact.

Cooling water is supplied via the cooling water inlet 22 of the stack manifold 14, flowing through the cells of the fuel cell stack 10, reaching the stack manifold 14, flowing further through the cooling water channel 14 in the stack manifold 14, and being discharged from the cooling water outlet 24.

Figure 2:
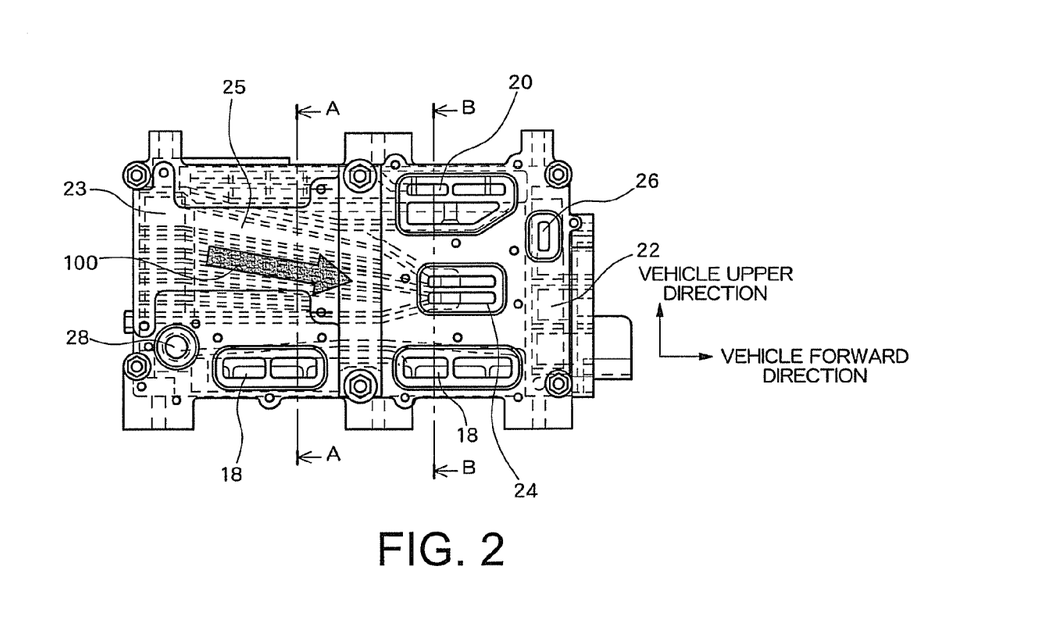
FIG. 2 is a plan view of the fuel cell system in this embodiment.

FIG. 2 is a plan view showing the fuel cell stack 10 viewed from the endplate 16 side. Focusing on the flow of cooling water, the cooling water is supplied via the cooling water inlet 22 of the stack manifold 14, being supplied into the fuel cell stack 10 from the front surface to the back surface of the sheet of the diagram, passing through, while cooling, the respective cells, thereafter flowing into a cell penetrating manifold from the back surface to the front surface of the sheet of the diagram, and flowing through the outlet 23 into the stack manifold 14. That is, the cell penetrating manifold is connected to the outlet 23, so that the cooling water having cooled the cells flows through the cell penetrating manifold and is then discharged from the outlet 23. On the back surface side, that is, on the terminal 12 side, of the stack manifold 14, a groove and a rib 25 are formed, so that the groove in the stack manifold 14 and the terminal 12 together constitute an in-stack manifold cooling water channel. The cooling water having flowed through the outlet 23 to the stack manifold 14, that is, the cooling water containing heat due to having cooled the cells, flows in the in-stack manifold cooling water channel in the arrowed direction in the diagram, that is, from the rear side to the front side of the vehicle, and is then discharged from the cooling water outlet 24 to outside of the stack manifold 14 and the end plate 16.

As described above, in this embodiment, the cooling water is not discharged to the outside from the outlet 23 connected to the cell through manifold. Instead, a cooling water outlet 24 is formed at a position different from the outlet 23, and the outlet 23 is connected to the cooling water outlet 24 via the in-stack manifold cooling water channel. The in-stack manifold cooling water channel is formed in the stack manifold 14, extending from the rear side to the front side of the vehicle, so that cooling water is discharged from the cooling water outlet 24 formed concentrated on the forward side of the vehicle. With the above, cooling water having cooled the cells can warm the stack manifold 14 and the end plate 16, so that condensation in the end cell can be effectively prevented. Moreover, this arrangement can use a shorter pipe for supplying the cooling water discharged from the stack manifold 14 and the end plate 16 to the radiator mounted in a front part of the vehicle.

Figure 3:
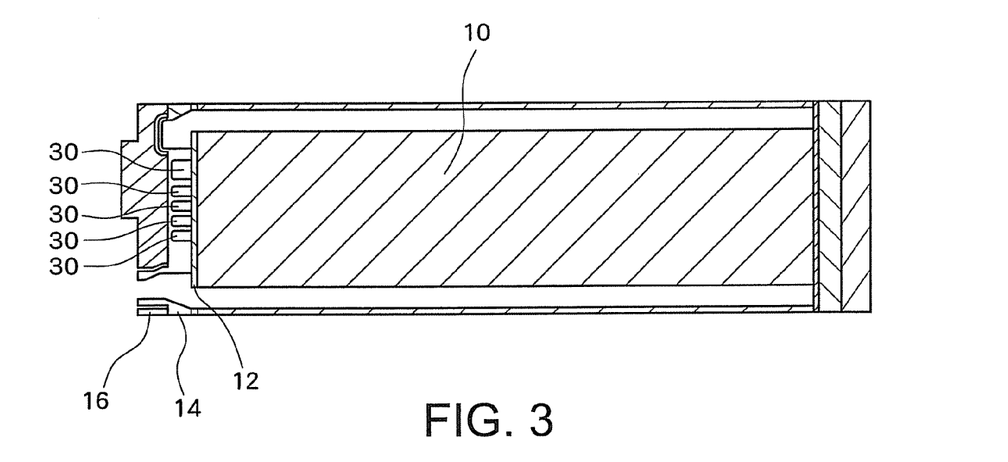
FIG. 3 is a cross sectional view along the Line A-A in FIG. 2.
Figure 4:
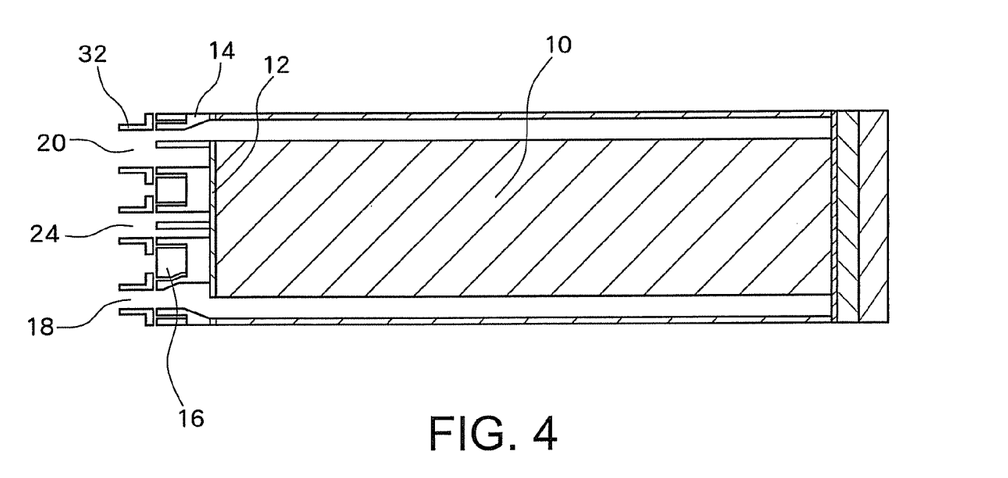
FIG. 4 is a cross sectional view along the Line B-B in FIG. 2.

FIG. 3 is a cross sectional view along the Line A-A in FIG. 2. FIG. 4 is a cross section view along the Line B-B in FIG. 2. On one side of the fuel cell stack 10, an end plate or a pressure plate and a stack case are integrally formed, while on the other side, the stack manifold 14 and the end plate 16 are placed. On the stack manifold 14 between the terminal 12 and the end plate 16, a plurality of grooves are formed in the up-down direction. By covering the grooves with the surface of the terminal 12, an in-stack manifold cooling water channel 30 is formed. The groove inside the stack manifold 14 is formed on the surface of the stack manifold 14 closer to the terminal 12, but not on the surface closer to the end plate 16. Therefore, the in-stack manifold cooling water channel 30 contacts the terminal 12, but not the end plate 16. This can ensure electrical insulation of the end plate 16, irrespective of the conductivity of the cooling water.

As shown in FIG. 4, a resin pipe 32 is connected to each of the cathode gas inlet 18, the cathode gas outlet 20, and the cooling water outlet 24. The downstream end of the in-stack manifold cooling water channel 30, that is, an end on the forward side of the vehicle, penetrates the stack manifold 14 and the end plate 16, and is connected to the cooling water outlet 24, and discharged from the resin pipe 32 to the radiator. Accordingly, the cooling water flowing in the stack manifold 14 is supplied from the resin pipe 32 to the radiator without contacting the end plate 16. Note that as known in FIG. 4, not only the cooling water outlet 24 but also the cathode gas inlet 18 and the cathode gas outlet 20 do not directly contact the end plate 16.

Figure 5:
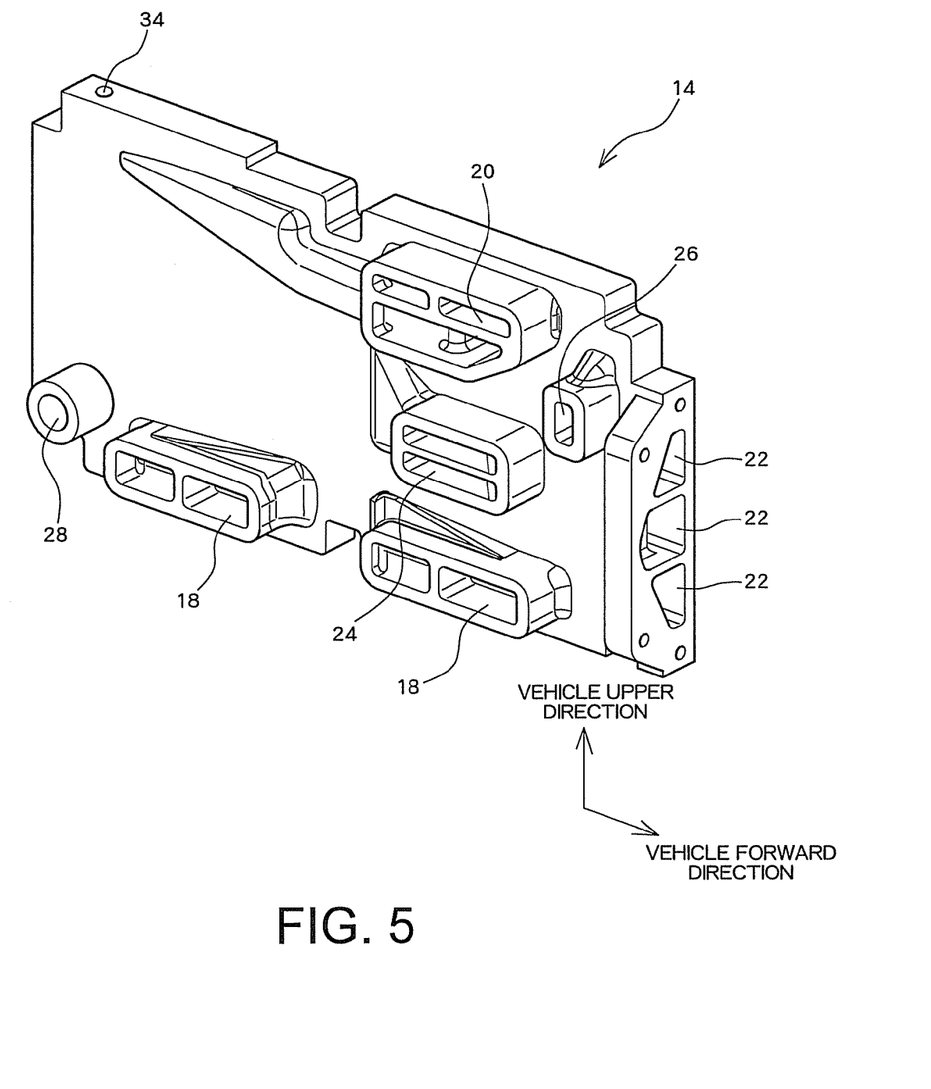
FIG. 5 is a perspective view showing external appearance of a stack manifold in this embodiment.
Figure 6:
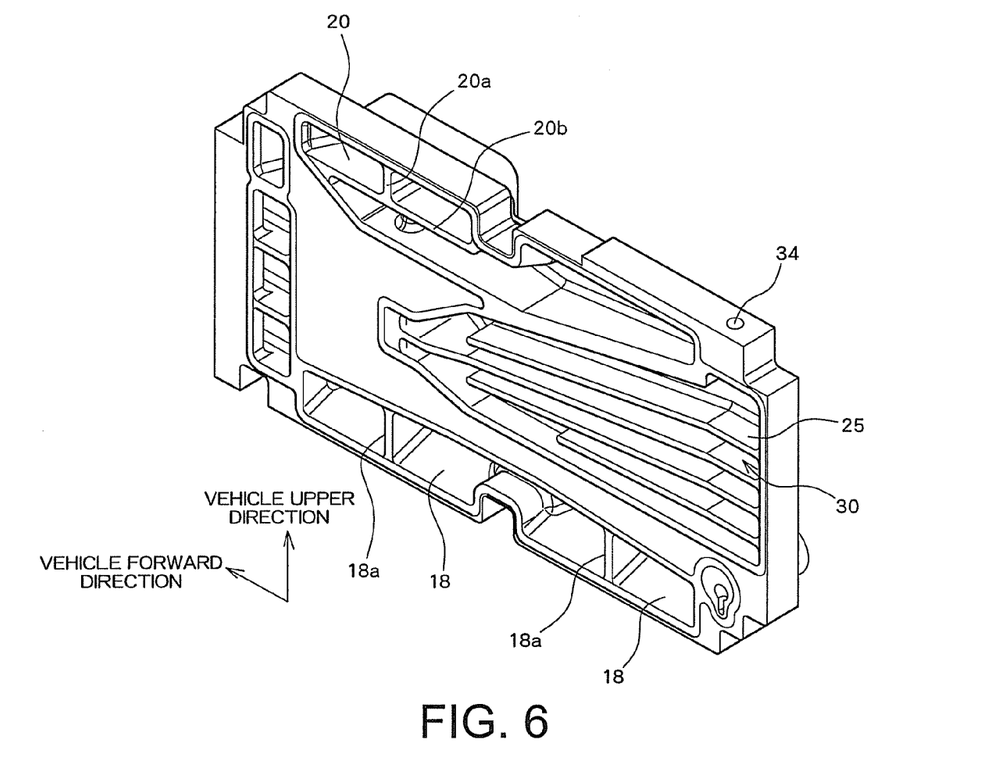
FIG. 6 is a perspective view showing external appearance of the stack manifold in this embodiment.

FIGS. 5 and 6 are perspective views showing external appearance of the stack manifold 14. FIG. 5 is a perspective view showing the stack manifold 14 viewed from the front surface side thereof, that is, the end plate 16 side, and FIG. 6 is a perspective view showing the stack manifold 14 viewed from the rear surface side thereof, that is, the terminal 12 side.

On the stack manifold 14, the cathode gas inlet 18, the cathode gas outlet 20, the cooling water inlet 22, the cooling water outlet 24, the anode gas inlet 26, and the anode gas outlet 28 are formed. In the vicinity of the outlet 23 of the stack manifold 14, that is, in the vicinity of the upstream end of the in-stack manifold cooling water channel, a cooling water air release hole 34 is formed, so that air contained in the cooling water is discharged from the hole 34 to the outside. Note that, in detail, the hole 34 is formed at a height equal to or higher than the top surface position of the outlet 23, that is, the top surface position of the cell penetrating manifold.

As shown in FIG. 6, on the surface of the stack manifold 14 opposed to the terminal 12, a groove and a rib 25 are formed extending from the rear side to the front side of the vehicle. The groove and the rib 25, and the terminal 12, constitute the in-stack manifold cooling water channel 30. Two or more grooves are formed. For example, five grooves are formed in the up-down direction, as shown in the diagram. The respective grooves are separated by the rib 25, and extend from the rear side to the front side of the vehicle. The respective ends of the plurality of grooves are all connected to the cooling water outlet 24. The rib 25 has a function of defining the groove, and also of receiving a load applied when fixing the fuel cell stack 10 by fixing the end plate 16 to the fuel cell stack 10, using a bolt.

In the cathode gas inlet 18, a rib 18a is formed in the up-down direction so as to separate the inlet in the front-back direction of the vehicle. Further, in the cathode gas outlet 20, two ribs 20a, 20b are formed so as to separate the outlet in the up-down direction and in the front-back direction of the vehicle. Cathode gas supplied via the cathode gas inlet 18 is supplied through the cell penetrating manifold to the respective cells, while off-gas from the respective cells is discharged through the cell penetrating manifold from the cathode gas outlet 20. With the ribs 18a, 20a, 20b provided in the inlet and the outlet, respectively, the flow of the cathode gas can be adjusted so as to control the flow of the cathode gas in the cell penetrating manifold such that the cathode gas is made uniform or divided into a desired flow amount.

Figure 7:
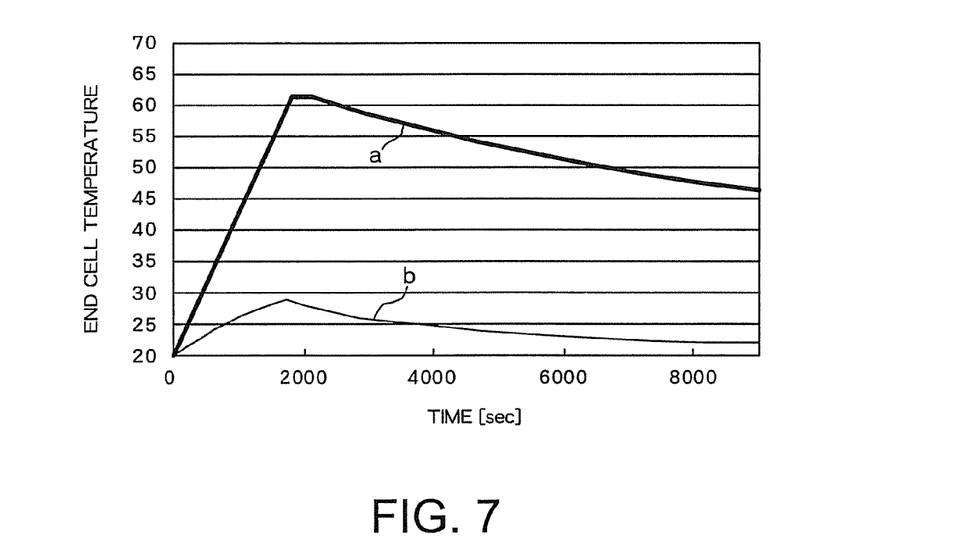
FIG. 7 is a graph showing change of the end cell temperature as time passes in this embodiment.

FIG. 7 shows change of the end cell temperature as time passes in this embodiment. For comparison, change of end cell temperature as time passes with no cooling water channel formed in the stack manifold 14 is additionally shown. In the diagram, the graph a is related to the embodiment, while the graph b is related to the comparison example. In the comparison example, the end cell temperature rises once, and thereafter drops gradually due to discharge from the end plate 16. Meanwhile, in this embodiment, as the cooling water having cooled the cells flows in the stack manifold 14 to thereby warm the end plate 16, the temperature of the end cell is maintained relatively high. In this embodiment, by warming the end plate 16, drop of the temperature of the end cell is reduced and condensation due to dropped temperature of the end cell is prevented. Accordingly, preferable power generation performance of the end cell can be maintained.

Figure 8:
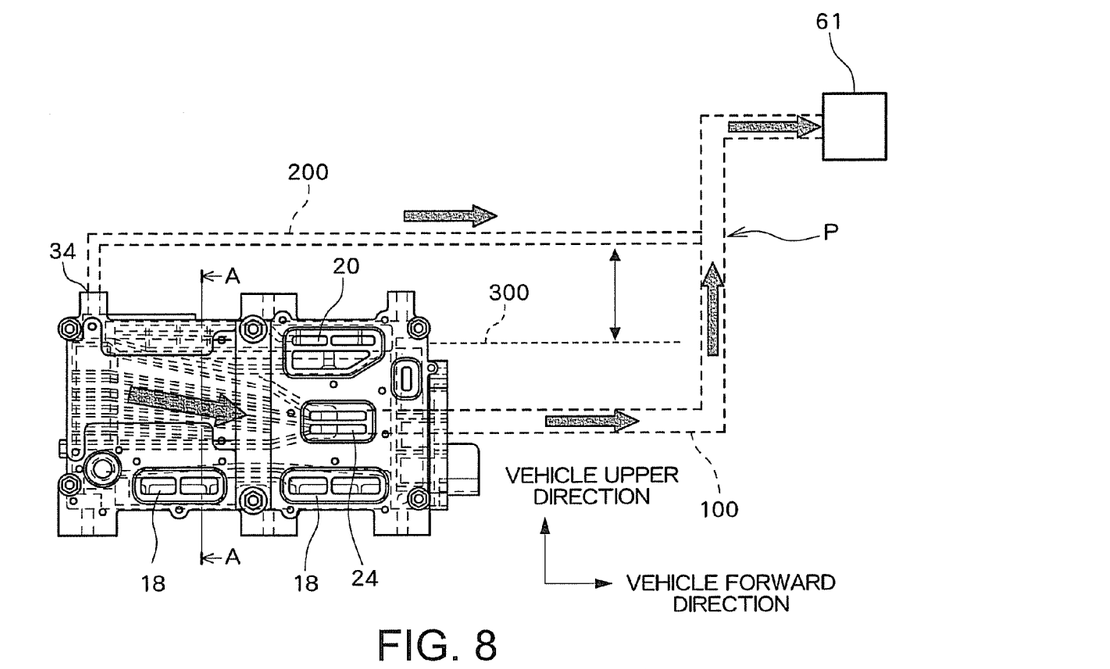
FIG. 8 is a diagram explaining a pipe system of the fuel cell system in this embodiment.

FIG. 8 shows a structure of a pipe system in this embodiment. The cooling water discharged from the cooling water outlet 24 flows through the discharge pipe 100 before being supplied to the radiator 60 mounted in a front part of the vehicle. Further, the air discharged from the air release hole 34 formed in an upper part of the stack manifold 14 on the rearward side of the vehicle flows through the air pipe 200 to be discharged. The air pipe 200 joins the pipe 100 at a joint point P. In this embodiment, the joint point P is set at a position higher than the height position 300 of the top surface of the cell outlet penetrating manifold. The top surface of the cell outlet penetrating manifold for cooling water, that is, the top surface of the outlet 23 shown in FIG. 2, is set at a height equal to the top surface of the cell surface of the fuel cell stack. Therefore, in consideration of air release nature, it is necessary for the position where the cooling water is discharged from the fuel cell stack to be set at a position higher than the top surface of the cell outlet penetrating manifold. However, when the air release hole 34 is formed at a position equal to or higher than the top surface of the cell outlet penetrating manifold, and the air release pipe 200 joins the discharge pipe 100 at a position higher than the height position 300 of the cell outlet penetrating manifold, the cooling water outlet 24 can be formed at a position lower than the height position 300 of the outlet penetrating manifold.

In this embodiment, although the cooling water flows in the stack manifold 14 to warm the end plate 16, the cooling water is not in direct contact with the end plate 16. Accordingly, the endplate 16 can be kept electrically isolated. This can simplify a structure for use in mounting a fuel cell system on a vehicle.

Figure 9:
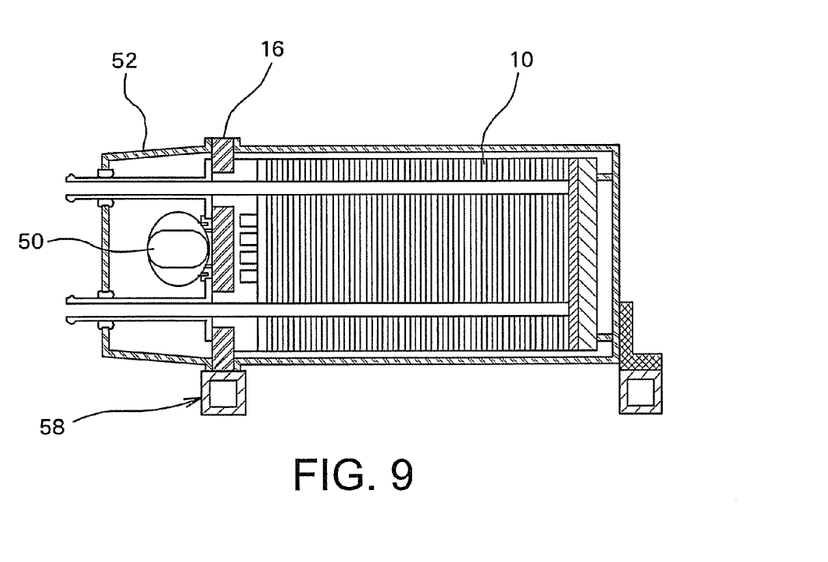
FIG. 9 is a diagram explaining the fuel cell system mounted on a vehicle in this embodiment.

FIG. 9 shows a structure for mounting a fuel cell system according to this embodiment on an electric vehicle. The fuel cell system is mounted, e.g., below the floor panel of a vehicle. As the end plate 16 is electrically insulated, the end plate 16 can be fixed directly on the stack frame 58 of the vehicle, which in turn is fixed on the frame of the vehicle. In other words, the end plate 16, which is electrically insulated, can be directly (that is, without a separate insulating member) electrically connected to the frame of a vehicle. In a diagram showing a vehicle, the end plate 16 having an accessory 50 mounted thereon is shown. The accessory 50 is covered by an accessory cover 52 separate from the stack case, and the accessory cover 52 is mounted on the end plate 16.

Figure 10:
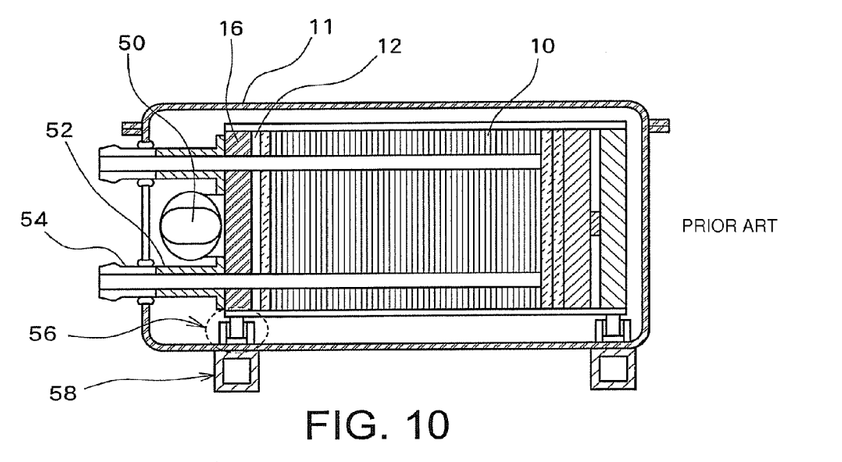
FIG. 10 is a diagram explaining a conventional system mounted on a vehicle.

Meanwhile, FIG. 10 shows a structure in which the endplate 16 is at the same potential as that of the fuel cell stack 10 as the endplate 16 is not insulated. In this case, as the endplate 16 is at the same potential as the fuel cell stack 10, the fuel cell stack 10, the end plate 16, and the accessories 50 all need to be accommodated in the stack case 11. The cooling water outlet or the like is connected via a metal pipe 52 to a resin pipe 54, and the stack case 11 is fixed to the stack frame 58 of the vehicle. Further, in order to ensure insulation between the stack case 11 and the end plate 16, the end plate 16 is supported by an insulated mount 56.

As described above, when the end plate 16 is not insulated, the end plate 16 cannot be connected to the stack frame 58 of the vehicle, and it is therefore necessary to ensure insulation between the stack case 11 and the end plate 16 before fixing the stack case 11 to the stack frame 58 of a vehicle via the stack case 11. This increases the number and size of components. Meanwhile, according to this embodiment, it can be understood that the stack case 11 can be mounted on a vehicle while ensuring insulation, using a simple structure, and also that the size can be reduced.

Although an embodiment of the present invention has been described above, the present invention is not limited to the above, and various modifications are possible.

For example, although the groove and the rib 25 are formed on the rear surface side of the stack manifold 14 so that the rib 25 receives a fastening load in this embodiment, a round or oval projection may be formed as the rib 25 along the groove to receive a fastening load.

Further, although the cooling water outlet 24, the cathode gas inlet 18, and the cathode gas outlet 20 are not in direct contact with the endplate 16, as shown in FIG. 4, and insulation of the endplate 16 is ensured in this embodiment, it is preferable to have a structure such that the anode gas inlet 26 and the anode gas outlet 28 as well are not in direct contact with the endplate 16, and a resin pipe is used for a connection pipe.

Figure 11:
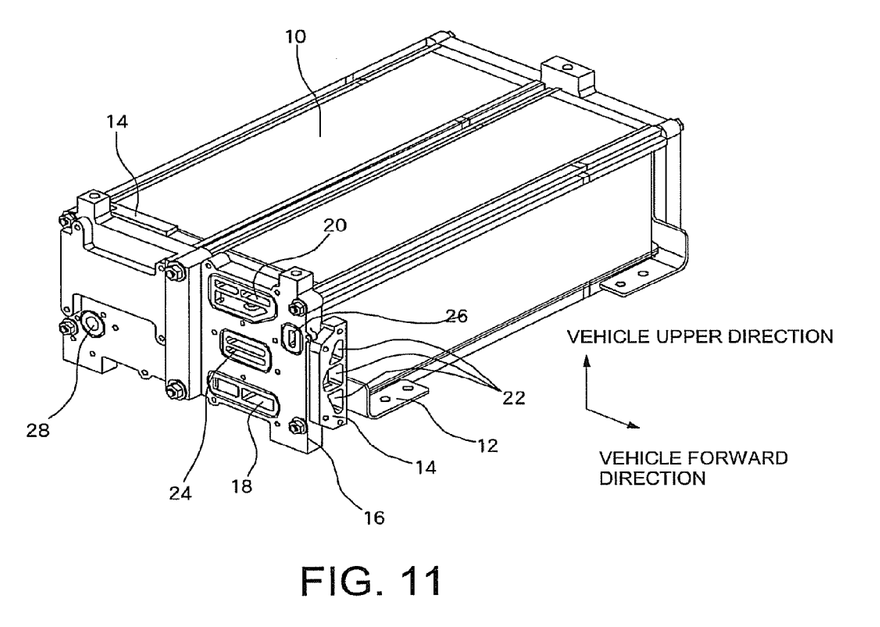
FIG. 11 is a perspective view showing external appearance of a fuel cell system in another embodiment.

Further, although two cathode gas inlets 18 are formed on a lower side of the end plate 16 in the front-back direction of the vehicle, as described above and shown in FIG. 1, in this embodiment, it may be acceptable to provide only one cathode gas inlet 18 on the forward side of the vehicle. FIG. 11 is a perspective view showing external appearance in this case. It is understood that a space for mounting accessories, such as a hydrogen pump, a gas-liquid separator, and so forth, on the end plate 16 is ensured on the rearward side of the vehicle.

Further, although the ribs 18a, 20a, 20b are formed on the cathode gas inlet 18 and the cathode gas outlet 20, respectively, for adjusting the flowing amount of the cathode gas, as shown in FIG. 6, in this embodiment, a flowing amount adjusting rib may be formed only on the cathode gas inlet 18 or the cathode gas outlet 20.

BRIEF DESCRIPTION OF REFERENCE NUMERALS 10 fuel cell stack, 12 terminal, 14 stack manifold, 16 end plate, 18 cathode gas inlet, 20 cathode gas outlet, 22 cooling water inlet, 24 cooling water outlet, 26 anode gas inlet, 28 anode gas outlet, 30 in-stack manifold cooling water channel.

The invention claimed is:
1. A fuel cell system, comprising:
a fuel cell stack comprising a plurality of cells being stacked;
a plate terminal provided at an end part of the fuel cell stack in a stacking direction;
a stack manifold adjacent to the terminal; and
an end plate adjacent to the stack manifold,
wherein
the stack manifold is disposed between the terminal and the end plate,
a groove is formed on a surface of the stack manifold, the surface being opposed to the terminal, wherein the groove includes a rib that tapers towards a water outlet in a direction towards a front side of the vehicle where a radiator is mounted,
the groove, the terminal, and the end plate together form a channel containing cooling water that flows in the fuel cell stack and circulates outside the fuel cell stack, wherein the terminal covers the groove and is in direct contact with the channel containing cooling water, and
the channel in the groove of the stack manifold is formed such that, in a state in which the fuel cell system is mounted on a vehicle, the cooling water flows inside the channel in the groove of the stack manifold from a rear side of the vehicle to the front side of the vehicle where the radiator is mounted.
2. The fuel cell system according to claim 1, wherein
a downstream end part of a cooling water channel penetrates the stack manifold and the end plate, and is connected to a cooling water outlet formed on the end plate, and
the cooling water is discharged to outside of the end plate without contacting the end plate.
3. The fuel cell system according to claim 1, wherein a rib is formed along the groove on the surface of the stack manifold, the surface being opposed to the terminal.
4. The fuel cell system according to claim 1, wherein
a cathode gas inlet and a cathode gas outlet are formed on the stack manifold, and
a rib for adjusting a flowing amount of cathode gas is formed in at least either one of the cathode gas inlet and the cathode gas outlet.
5. The fuel cell system according to claim 1, wherein a hole for discharging air contained in the cooling water is formed on an end part of the stack manifold at a position at a height equal to or higher than an upstream end part of the cooling water channel.
6. The fuel cell system according to claim 1, wherein
a cooling water outlet for discharging the cooling water to the outside, a cathode gas inlet, and a cathode gas outlet are formed on the end plate, and
the cooling water outlet, the cathode gas inlet, and the cathode gas outlet are formed concentrated on the front side of a vehicle in a state in which the fuel cell system is mounted on the vehicle.
7. The fuel cell system according to claim 2, wherein, in a state in which the system is mounted on a vehicle, the end plate is electrically connected to a frame of the vehicle.

* * * * *